United States Patent Office 2,708,081
Patented May 10, 1955

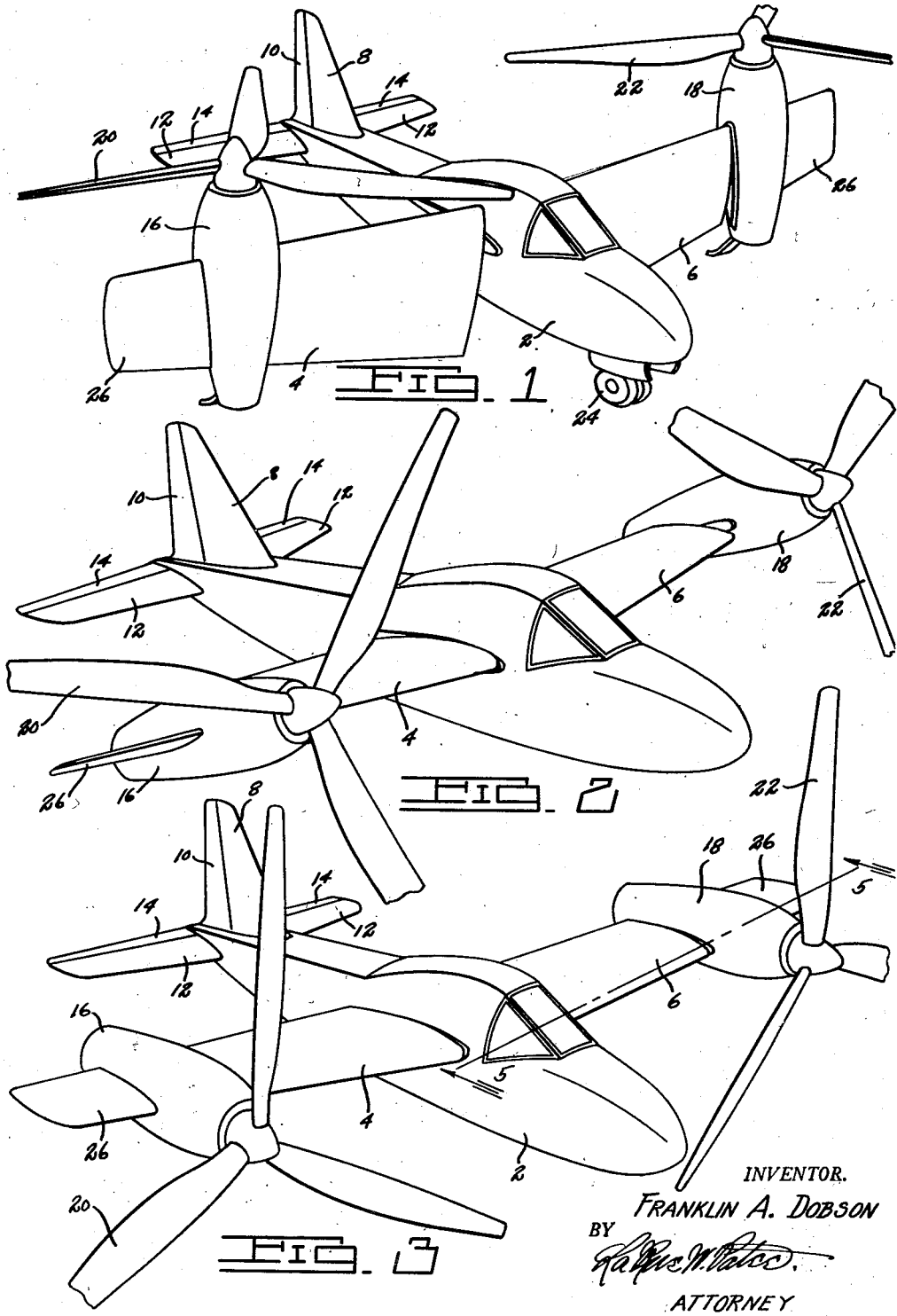

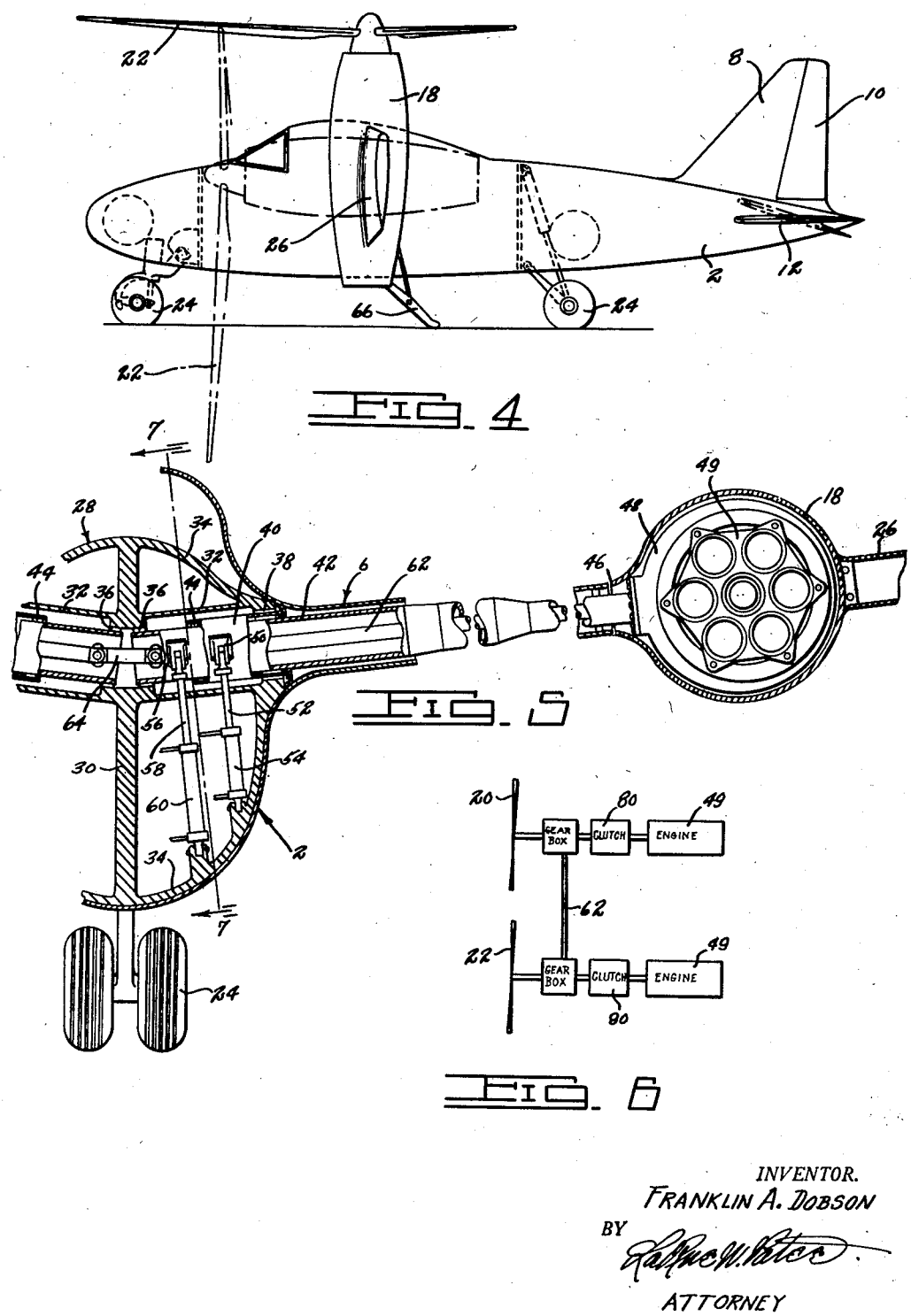

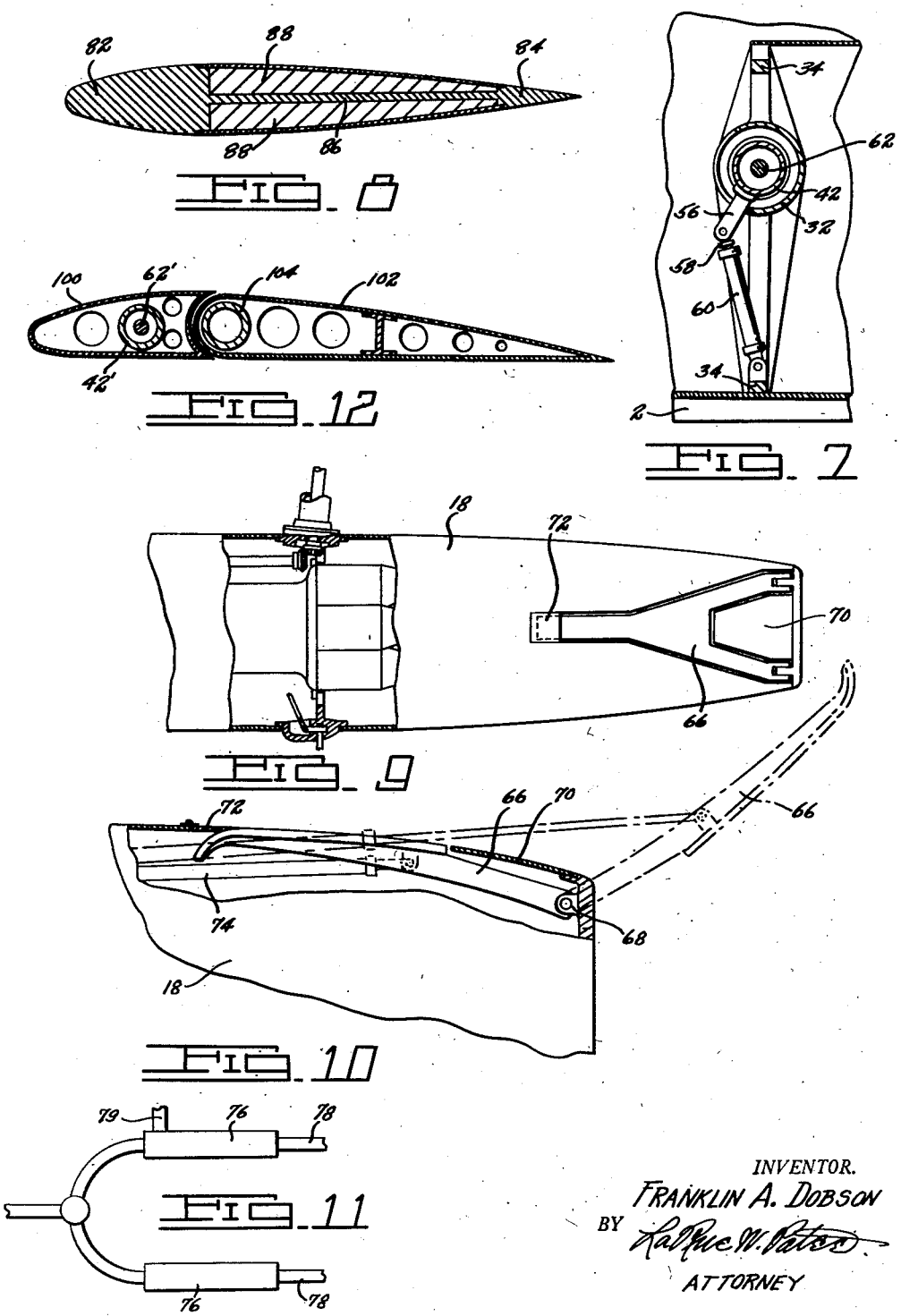

2,708,081

CONVERTIBLE AIRCRAFT STRUCTURE

Franklin A. Dobson, Royal Oak, Mich., assignor to John Oliver Black, Detroit, Mich.

Application September 11, 1950, Serial No. 184,199

6 Claims. (Cl. 244—7)

This invention relates to aircraft, and more particularly to an aircraft of the helicopter type in which dual vertically lifting propellers may be tipped from a horizontal plane of rotation to a vertical plane of rotation in combination with adjustable wings operable independently of the control for tilting the propellers and independently of each other.

It is an object of the present invention to provide dual air screws, one at the opposite sides of the fuselage, which are independently tiltable but driven in opposite directions at the same rate of speed and to provide a power transmission assembly which is directly connected to the propellers and tiltable therewith independently of the fuselage and the wings.

Another object of the invention is to provide a skid on each of the power transmission assemblies which will take the weight of the power transmission assemblies in landing, thus relieving the wings of the bending load.

A further object of the invention is to provide control means for the independently movable propellers and wings which will produce simultaneous operation of propellers and wings through a predetermined range and control means for the wings independently of the propeller or beyond the predetermined range of simultaneous operation.

A still further object of the invention is to provide a tubular spar rotatably supported at one end in the fuselage with its opposite and outer end provided with a yoke, the latter surrounding and supporting the power transmission assembly; to provide a rotatable sleeve around the tubular spar for supporting the wing; and to provide control means within the fuselage for rotating the tubular spar and the tubular sleeve.

Other objects and advantages of the invention will more fully appear from the following description taken in connection with the accompanying drawings, in which:

Fig. 1 is a perspective view of the aircraft showing the wings and power transmission assemblies in a vertical position with the propellers in a horizontal plane for vertical lift;

Fig. 2 is a view corresponding to Fig. 1 but showing the wings and propellers in an inclined position to give both forward motion and some lift;

Fig. 3 is a view similar to Figs. 1 and 2 but showing the wings and propellers in a position for forward level flight;

Fig. 4 is a side elevational view of the aircraft showing the propellers in a horizontal plane for vertical lift when operating as a helicopter;

Fig. 5 is a cross sectional view taken on line 5—5 of Fig. 3 of a portion of the fuselage, motor supporting spar and motor on enlarged scale, parts being broken away;

Fig. 6 is a diagrammatic view illustrating the driving arrangement of the power transmitting mechanism;

Fig. 7 is a fragmentary sectional view of one control for the rotatable power unit, taken on line 7—7 of Fig. 5;

Fig. 8 is a cross sectional view through a propeller blade;

Fig. 9 is a fragmentary, top plan view of power unit housing, showing the skid and locking means for the removable wing tip, parts being broken away;

Fig. 10 is a fragmentary side view of the skid and its control;

Fig. 11 is a sectional view of a modified form of wing and engine control mechanism; and Fig. 12 is a cross sectional view through a modified form of wing construction.

Referring to the drawings, I have shown the aircraft consisting of a fuselage 2 having pivotally attached thereto wings 4 and 6, and an empennage including a vertical stabilizer 8, a rudder 10, horizontal stabilizers 12, and elevators 14. The empennage is conventional and is operated by controls (not shown) in accordance with conventional means for operating the rudder and elevators. The nacelles 16 and 18 including the power transmitting rotors are rotatably supported at the opposite sides of the fuselage for driving rotors carrying the propellers 20 and 22. Retractable landing wheels 24, arranged in tandem, are provided on the fuselage. A removable wing tip 26 is carried at the outer surface of each of the power units 16 and 18.

Referring to Fig. 5, the fuselage 2 is provided with a main framework 28 having a central vertical rib 30, laterally extending tubular sections 32 and outer ribs 34 conforming generally to the shape of the fuselage. Each tubular section 32 is provided with axially spaced bearings 36 and 38. The hollow wing 6 is provided with a tubular extension 40 rotatably supported in the bearing 38. A tubular spar 42 is rotatably supported in the tubular extension 40 being journaled in the bearing 36 and a bearing 44. This tubular spar 42 extends outwardly through the hollow wing 6. The spar 42 is shown decreasing in diameter toward the outer end. The outer end of the wing 6 is rotatably supported on the spar 42 as shown at 46.

At the outer end of the spar 42 and rigidly secured thereto is an annular yoke 48 which supports the power unit assembly which may be an engine 49 of the internal combustion type, or turbo-prop. The wing 6 is rotatably mounted in the framework 28 and the spar 42 is rotatable in the framework 28 and wing 6.

An arm 50 is attached to the tubular extension 40 of the wing 6. A piston rod 52 is pivoted to the arm 50 and is actuated in a cylinder 54 by hydraulic pressure for turning the wing 6. The operator applies a fluid pressure through connection 55 for moving the piston rod 52 upwardly and through connection 57 for moving the rod 52 downwardly. A similar control arrangement, consisting of arm 56, rod 58 and cylinder 60, are provided for turning the spar 42. Inlet and outlet connections 61 and 62 being provided for supplying a fluid pressure to the cylinder 60. These controls are operated by the pilot in the usual manner.

The engines 49 are interconnected by a drive shaft 62 which extends through the tubular spar 42 so that, should one engine fail, both engines will be turning at the same R. P. M. A universal joint connection 64 is arranged in the shaft 62 to provide for the slight angular relation of the wings.

It is to be understood that the above description applies to one power unit and a wing at one side of the aircraft but the parts are similar at the opposite side, thereby providing dual assemblies and controls so that each unit may be independently moved. The wings are each independently movable. The engines are independently movable and the wings are independently movable relative to the engines.

Each streamlined nacelle, including the engine and power driving means and propeller, is supported by the spar 42, which is mounted in bearings in the fuselage so that it can be swung from a horizontal to a vertical position. Each wing panel, from the fuselage to the nacelle, is independently mounted on a torque tube which allows it to be swung through a similar range of angles.

Each nacelle is provided with a retractable skid 66 on the aft end for taking the weight of the power plant in landing, thus relieving the wings of much of the bending load. The skids are pivotally mounted on the framework of the nacelle, as shown at 68 in Fig. 10, and are foldable into the shell through an opening 70 in the shell. A swinging flap 72 partially closes the opening when the skid is retracted and the flap and outer surface of the skid close the opening. A suitable hydraulic cylinder and piston control 74 embodying shock absorber qualities is provided for moving the skid outwardly to a position shown by dotted lines in Fig. 10.

The retractable landing wheels are hydraulically controlled in the conventional manner by the operator.

Referring to Fig. 11, I have shown a dual cylinder and piston arrangement for simultaneously operating a wing and its associated nacelle. In this design the dual cylinders 76 receive a fluid pressure from a single source so that both pistons 78 move uniformly when the cylinders are of the same diameter. A by-pass 79 may be provided in one of the cylinders so that one piston may be stopped while the other piston continues its travel, thus, providing additional travel of one piston over the other.

The propeller blades are of large diameter and rotate in opposite directions by a direct gearing of the rotors together through shaft 62 and employing an over-riding clutch 89 interposed between the engine 49 and the propellers. By such an arrangement, one engine alone is capable of driving both propellers. When both engines are operating at the same speed, they each will assume proper load distribution. The over-riding clutch has the additional advantage in that in the event of engine failure or stoppage the rotors continue to operate freely as an autogyro.

Referring to Fig. 8, I have shown the construction of propeller blade. These blades are semi-rigid blades for eliminating most of the gyroscopic forces on the blades. The blade is preferably formed from an aluminum alloy forging having enlarged portions 82 and 84 at its opposite sides respectively, connected together by an integral rib 86. The portion 82 at the forward edge of the blade is larger than the portion 84 so that the balance is approximately 25% forward or at a point substantially at the intersection of the portion 82 and the rib 86. The space between the enlarged portions 82 and 84 is provided with a low density, cellular or honeycomb, material 88 and the outer surfaces of the material 88 is covered with an aluminum alloy skin 90.

When it is desired to make a vertical take off, both nacelles are rotated to a vertical position. In this position the propellers act as helicoptor rotors, which have sufficient lift to raise the ship vertically and achieve quite a high rate of vertical climb. In this maneuver, the wings are also set vertically, so that they cause practically no interference with the rotor down-wash. Fig. 1 illustrates the vertical take off position of parts. By increasing the pitch on one rotor and decreasing it on the other, rolling movements can be applied as desired. The nacelles may be tilted forward or backward for changing the direction of the lift vectors. If side slip is desired or a correction to side slip, such may be accomplished by moving one forward and one backward and the ship rotates about a vertical axis.

At the beginning of conversion from helicopter flight to airplane flight, the aircraft is assumed to be flying horizontally as a helicopter at a reasonable speed. During conversion, the nacelles are gradually tipped forward and after speed pick up the lift is transferred to the wings.

Since the wings and nacelles can be adjusted separately, it will be assumed that the wings are set at the angle of attack for maximum lift over drag. The load taken by the wings varies as the square of the forward speed. The remainder of the vertical load is taken by the vertical component of the rotor thrust. The horizontal component of rotor thrust is available to overcome drag and accelerate the aircraft.

When flying as an airplane, one difference between the present design and a conventional airplane is the large diameter propellers. Since these revolve in opposite directions, gyroscopic couples cancel out provided there is the same rate of change of propeller axes.

A main feature of the present design, as distinguished from conventional airplanes, is that the wing incidence can be varied independently from the angle of inclination of the rotor axis. This gives very much higher efficiency than would be possible if the wings were fixed either to the fuselage or to the rotors. In the former case, the wings interfere with the rotor operation during take off. In the latter case, during conversion from vertical to horizontal flight the wings stall during part of the process, resulting in very high power losses, and a dangerous condition in case of power failure.

When landing, the nacelles are turned to the vertical position and the rotors autorotating and the wings are set at the angle of maximum lift. The skids are positioned outwardly. The weight of the fuselage is taken by the landing wheels 24 and the weight of the nacelles is taken by the skids.

In the operation of the vehicle, one of the engines may be started which, due to the over-riding clutch, will operate both of the propellers. When the second engine is started it will function to supplement the power of the oppositely disposed engine. Upon attaining the proper operating speed, the vehicle will lift vertically. In accordance with the present invention, it is intended that the angle of attack of the separate blades are not separably controlled and, also, that no cyclic pitch control is required. This is an important feature of the design.

Referring to Fig. 12 I have shown a forward portion of the wing 100 fixed to the fuselage with the tubular spar 42' which rotates the motor. The aft section 102 of the wing is rotatably mounted on a spar 104 which is spaced from the spar 42'. This construction provides a means for strengthening the motor support.

As thus shown and described, it is apparent that I have provided an airplane which may be flown as a helicopter and easily converted to forward flight. While I have shown and described a preferred embodiment of the invention, it will be understood that various changes, including the size, shape and arrangement of parts, may be made without departing from the spirit of my invention and it is not my intention to limit its scope other than by the terms of the appended claims.

I claim:

1. An aircraft comprising a fuselage, a wing at each of the opposite sides of said fuselage, means for turning the plane of said wings about an axis extending transversely of said fuselage, and power units including propellers at the outer ends of said wings supported on a rotatable spar carried by said fuselage, said wings and power units being independently movable relative to the fuselage.

2. An aircraft comprising a fuselage, a wing at each of the opposite sides of said fuselage, means for turning the plane of said wings about an axis extending transversely of said fuselage, rotatable spars supported at one end on said fuselage and each extending outwardly through and beyond the outer end of each of said wings, a power unit including a propeller carried by the outer end of each of said spars, and means for rotating said wings and said power units relative to the fuselage and independently of each other.

3. An aircraft comprising a fuselage, a wing having a tubular member rotatably supported in said fuselage, a control for rotating said tubular member, a tubular spar through said tubular member and rotatably supported in said fuselage, a control for rotating said spar, a yoke carried by the outer end of said spar beyond the outer end of said wing, a power driving unit carried by said yoke, and a propeller driven by said power unit.

4. An aircraft comprising a fuselage, a wing at each of the opposite sides of said fuselage, means for turning the plane of said wings about an axis extending transversely of said fuselage, a power unit at each of the outer ends of said wings, propellers driven by said power units, a rotatable spar supporting said power unit to said fuselage, a driving connection between said propellers for producing equal rotation thereof, and an over-riding clutch between each said power unit and said driving connection.

5. An aircraft comprising a fuselage, a framework within said fuselage, a tubular spar rotatably supported in said framework and projecting outwardly beyond one side of said fuselage, a wing rotatably supported on said spar and journaled in said framework, controls for said wing and said spar for independently or simultaneously rotating the same, a yoke at the outer end of said spar, a power unit supported by said yoke, and a removable wing section carried by said yoke.

6. An aircraft comprising a fuselage, wings at the opposite sides of said fuselage, a nacelle at each of the outer ends of said wings supported from said fuselage, an engine and gear box in each nacelle, an over-riding clutch forming a driving connection between said engine and said gear box, a propeller driven by said gear box, and a driving connection between said gear boxes.

References Cited in the file of this patent
UNITED STATES PATENTS

| | | |
|---|---|---|
| 1,846,992 | Decker | Feb. 23, 1932 |
| 1,891,166 | Leupold | Dec. 13, 1932 |
| 1,951,817 | Blount | Mar. 20, 1934 |
| 1,992,338 | Whitworth | Feb. 26, 1935 |
| 2,482,936 | Renoux | Sept. 27, 1949 |